(12) United States Patent
Enders

(10) Patent No.: US 6,331,067 B1
(45) Date of Patent: Dec. 18, 2001

(54) MOTOR VEHICLE LAMP

(75) Inventor: Martin Enders, Munich (DE)

(73) Assignee: Patent-Treuhand-Gesellschaft fuer elektrische Gluehlampen mbH, Munich (DE)

( * ) Notice: Subject to any disclaimer, the term of this patent is extended or adjusted under 35 U.S.C. 154(b) by 0 days.

(21) Appl. No.: 09/575,008

(22) Filed: May 19, 2000

(30) Foreign Application Priority Data

May 26, 1999 (DE) .............................. 199 23 919

(51) Int. Cl.$^7$ .............................. F21V 8/00; F21W 101/14
(52) U.S. Cl. ........................... 362/503; 362/511; 362/541
(58) Field of Search .................................... 362/503, 493, 362/511, 263, 541

(56) References Cited

U.S. PATENT DOCUMENTS

| | | | |
|---|---|---|---|
| 4,935,722 | * 6/1990 | Pollack | 362/503 X |
| 5,211,466 | * 5/1993 | Jarocki et al. | 362/493 X |
| 5,347,435 | * 9/1994 | Smith et al. | 362/503 |
| 5,400,225 | * 3/1995 | Currie | 362/503 X |
| 5,634,708 | * 6/1997 | Koie et al. | 362/503 |
| 6,128,431 | * 10/2000 | Siminovitch | 362/511 X |

* cited by examiner

Primary Examiner—Laura K. Tso
(74) Attorney, Agent, or Firm—William E. Meyer

(57) ABSTRACT

The invention relates to a motor vehicle lamp having a light source (4), at least one optical conductor (6) which is optically coupled to the light source (4), and operating means (5) for the light source (4). The optical conductor (6) has a light exit surface (8) whose curvature is adapted according to the invention to the curvature of the motor vehicle.

7 Claims, 2 Drawing Sheets

MOTOR VEHICLE LAMP

TECHNICAL FIELD

The invention relates to electric lamps and particularly to automotive lamps. More particularly the invention is concerned with interiorly mounted lamps.

The invention relates to a motor vehicle lamp in accordance with the preamble of patent claim 1.

BACKGROUND ART

It is known to mount a lamp inside a vehicle that projects light through a window such as a high mounted stop lamp. These lamps and their associated lamps housings may be mounted on the window or suspended from the interior ceiling to be adjacent a window.

DISCLOSURE OF THE INVENTION

It is the object of the invention to provide a motor vehicle lamp which can be used independently of the form of the light source in the motor vehicle.

This object is achieved according to the invention by the distinguishing features of patent claim 1. Particularly advantageous designs of the invention are described in the subclaims.

The motor vehicle lamp according to the invention has a light source, at least one optical conductor which is optically coupled to the light source, and operating means for the light source. According to the invention, the optical conductor has a light exit surface whose curvature is adapted to the curvature of the motor vehicle. The abovenamed features permit the motor vehicle lamp according to the invention to be fitted with commercially available light sources and operating means and to be adapted with simple means to different vehicle shapes. To adapt the lamp according to the invention to the motor vehicle shape, it suffices to fit the shape of the at least one optical conductor, in particular the curvature of its light exit surface, to the configuration of the corresponding motor vehicle area.

In accordance with the particularly preferred exemplary embodiments of the invention, the curvature of the light exit surface of the optical conductor is adapted to the contour of the vehicle rear window or to the contour of the vehicle body. It is possible thereby to implement stop lamps and turn signal lamps which are fitted with commercially available lamps and optimally coordinated with the vehicle shape.

It is advantageous to use a neon gas discharge lamp or a fluorescent lamp as a light source. These lamps have a high light yield and a long service life, and can be produced with small dimensions. Moreover, red or orange light can be produced in a simple way with their aid. A commercially available electronic ballast is advantageously used as operating means for the abovenamed lamps. Such ballasts are distinguished by a compact design. In order to ensure light is coupled as effectively as possible into the at least one optical conductor, the at least one optical conductor is provided with a tubular cutout for holding the light source. The diameter of the cutout is preferably coordinated with the dimensions of the light source. In order to improve the electromagnetic compatibility of the motor vehicle lamp according to the invention, the electronic ballast is fitted with an electrically conducting layer or foil or with a metal housing which is connected to frame potential or ground potential. Moreover, for the same purpose the lamp or/and the at least one optical conductor is provided with an electrically conducting layer or foil which is connected to frame potential or ground potential.

BEST MODE FOR CARRYING OUT THE INVENTION

Figure 1:
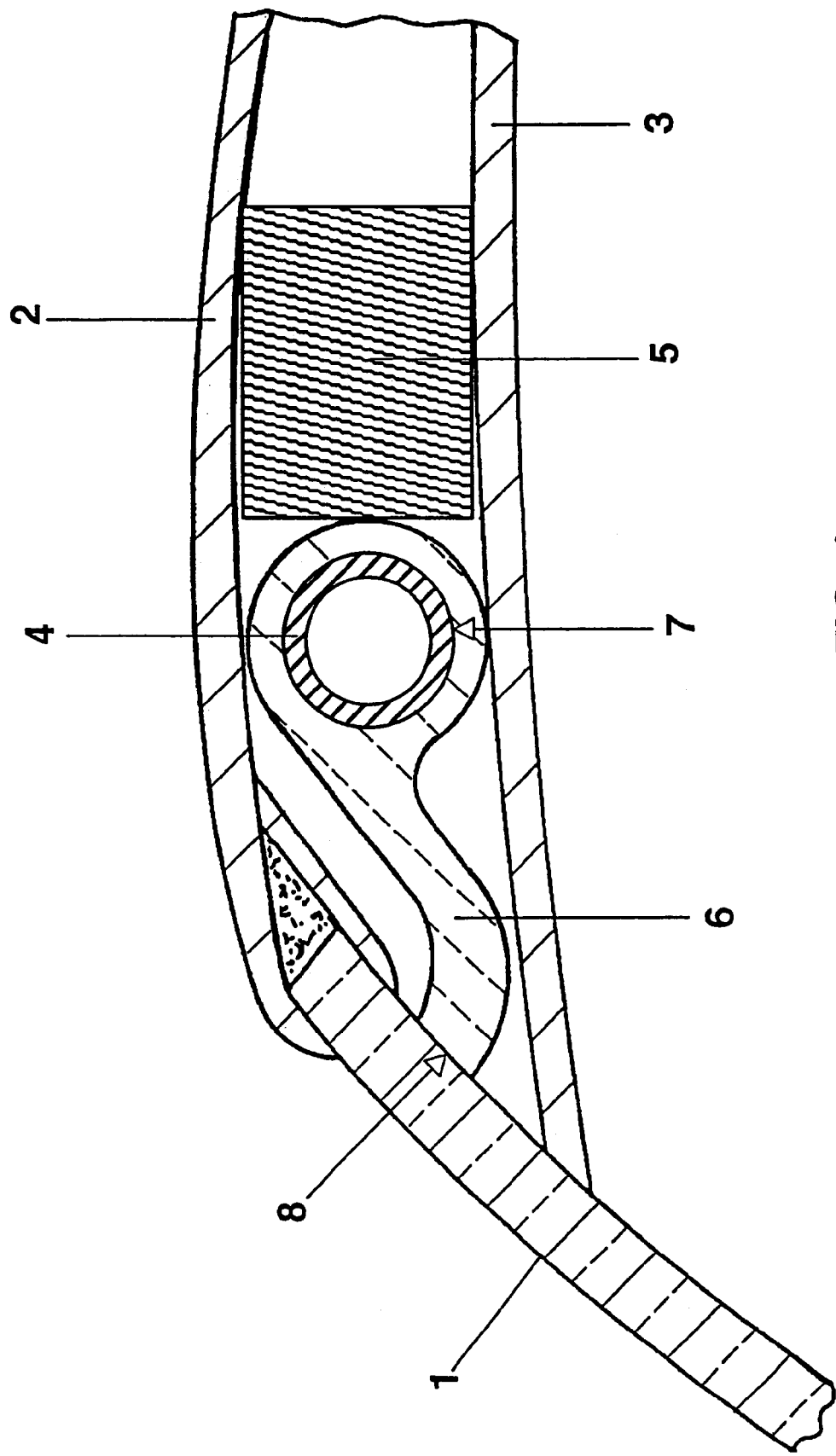
FIG. 1 shows a cross section through a motor vehicle lamp according to the invention, in accordance with a preferred exemplary embodiment of the invention.
Figure 2:
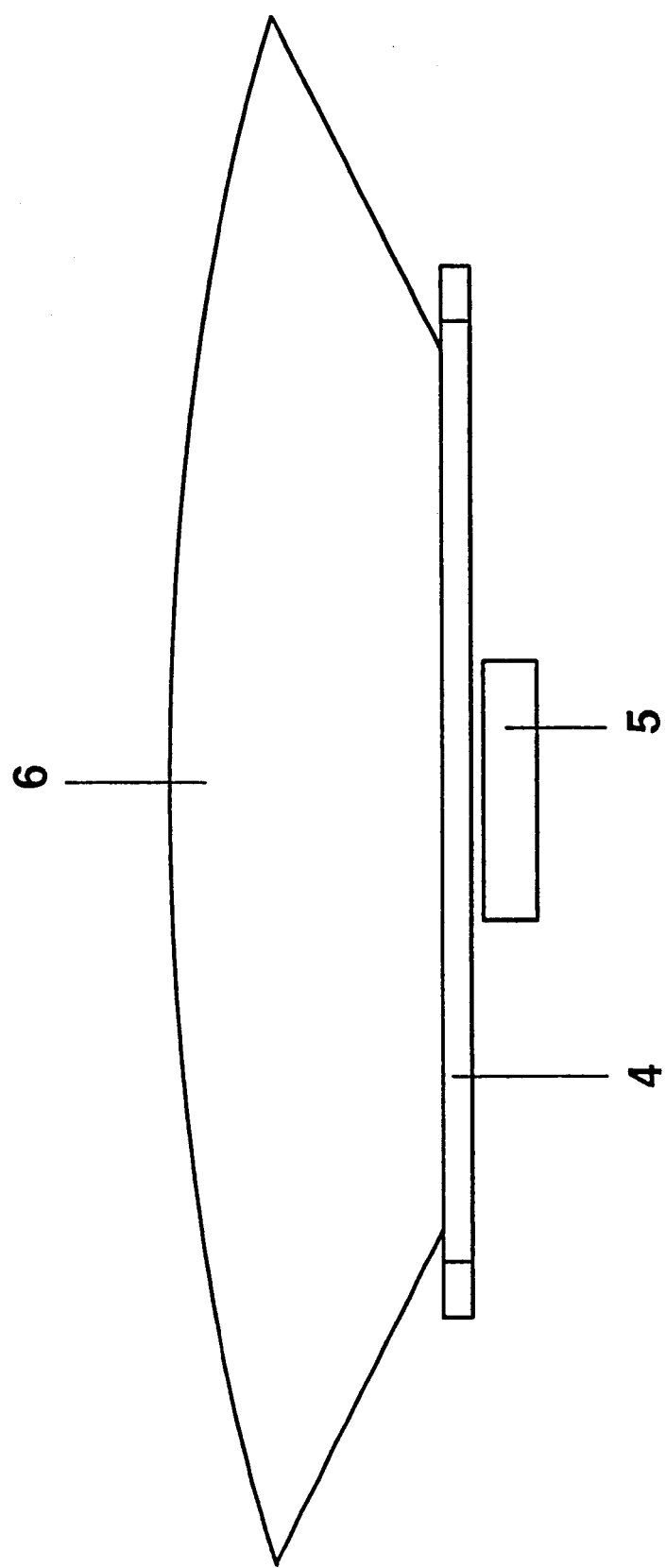
FIG. 2 shows a schematic plan view of the exemplary embodiment illustrated in FIG. 1.

The preferred exemplary embodiment, illustrated in FIGS. 1 and 2, of the invention is a high-level stop lamp which is arranged on the upper edge of the vehicle rear window 1. The stop lamp is arranged in the interspace between the vehicle roof 2 and the roofliner 3. It comprises a tubular neon gas discharge lamp 4, a commercially available electronic ballast 5 for operating the lamp 4, and an optical conductor 6. The tubular neon gas discharge lamp 4 is arranged in a cutout 7 in the optical conductor 6, whose diameter is coordinated to fit with the outside diameter of the neon gas discharge lamp 4. The optical conductor 6 has an elongated light exit surface 8 whose curvature is adapted to the curvature of the rear window 1. The light exit surface 8 of the optical conductor 6 bears in a self-closed fashion against the rear window 1. In order to improve the electromagnetic compatibility of the stop lamp, the lamp vessel of the neon gas discharge lamp 4 is provided with a transparent electrically conductive indium tin oxide layer (ITO layer) which is connected to the frame potential of the ballast 5. For the purpose of protection and of achieving the effect of optical conduction and of launching the light into the optical conductor 6 as well as improving the electromagnetic compatibility of the lamp, the outer surface of the optical conductor 6 is provided with an electrically conducting, optically reflecting coating, which is likewise connected to the frame potential of the ballast 5. Moreover, likewise for the purpose of improving the electromagnetic compatibility, the inner wall of the ballast housing is metalized a connected to the frame potential of the ballast 5.

The invention is not limited to the exemplary embodiment described in more detail above. The motor vehicle lamp according to the invention can also be designed, for example in the case of a convertible, as a stop lamp which is arranged on the vehicle tailgate. In this case, the curvature of the light exit surface of the optical conductor is adapted to the contour or shape of the tailgate. The associated lamp and the ballast required for operating the lamp are arranged, for example, on the inner wall of the tailgate. The motor vehicle lamp according to the invention can, however, also be designed as a turn signal lamp which is arranged in the rear or front region of the vehicle. In this case, the curvature of the light exit surface of the optical conductor is adapted to the contour of the vehicle rear region or front region.

What is claimed is:

1. A motor vehicle lamp comprising:

a single piece optical conductor (6) having a light input surface defining an interior cavity, the optical conductor (6) providing an internally reflective guide leading from the input surface to a light exit surface (8) whose curvature is adapted to the curvature of a motor vehicle and directed to a field to be illuminated, and a light source (4) positioned in the interior cavity.

2. The motor vehicle lamp as claimed in claim 1, wherein the curvature of the light exit surface (8) of the optical conductor (6) is adapted to the contour of the vehicle rear window (1).

3. The motor vehicle lamp as claimed in claim 1, wherein the curvature of the light exit surface of the optical conductor is adapted to the contour of the vehicle body.

4. The motor vehicle lamp as claimed in claim 1, wherein the light source (4) is a gas discharge lamp having an operating means.

5. The motor vehicle lamp as claimed in claim 4, wherein the operating means (5) is an electronic ballast.

6. The motor vehicle lamp as claimed in claim 1, wherein the optical conductor (6) has a tubular cutout (7) for holding the light source (4).

7. The motor vehicle lamp as claimed in claim 2, wherein the motor vehicle lamp has a flat design to the effect that it can be inserted between a metal roof (1) and a roofliner (3) of the motor vehicle.

* * * * *